(12) United States Patent
    Yasui

(10) Patent No.: US 10,887,475 B2
(45) Date of Patent: Jan. 5, 2021

(54) COMMUNICATION APPARATUS AND CONTROL METHOD THEREFOR

(71) Applicant: KYOCERA Document Solutions Inc., Osaka (JP)

(72) Inventor: Yoshiaki Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/683,957

(22) Filed: Nov. 14, 2019

(65) Prior Publication Data
    US 2020/0186656 A1    Jun. 11, 2020

(30) Foreign Application Priority Data
    Dec. 7, 2018 (JP) ................................ 2018-230287

(51) Int. Cl.
    *H04N 1/00*    (2006.01)
    *H04N 1/327*   (2006.01)

(52) U.S. Cl.
    CPC ....... *H04N 1/00214* (2013.01); *H04N 1/0001* (2013.01); *H04N 1/00037* (2013.01); *H04N 1/00076* (2013.01); *H04N 1/00084* (2013.01); *H04N 1/00477* (2013.01); *H04N 1/32726* (2013.01)

(58) Field of Classification Search
    None
    See application file for complete search history.

(56) References Cited

U.S. PATENT DOCUMENTS

| | | | | |
|---|---|---|---|---|
| 4,829,524 A * | 5/1989 | Yoshida | ................ | H04L 1/1874 714/748 |
| 5,249,220 A * | 9/1993 | Moskowitz | ............. | H03M 7/40 341/106 |
| 5,739,919 A * | 4/1998 | Lee | ........................ | H04N 1/001 358/407 |
| 6,023,470 A * | 2/2000 | Lee | ........................ | H04L 12/66 370/401 |
| 6,256,115 B1 * | 7/2001 | Adler | ................. | H04N 1/00209 358/407 |
| 6,278,532 B1 * | 8/2001 | Heimendinger | ... | H04N 1/00209 358/442 |
| 7,082,106 B2 * | 7/2006 | Sharma | ............... | H04L 12/6418 370/276 |

(Continued)

FOREIGN PATENT DOCUMENTS

JP    1-155760 A    6/1989

*Primary Examiner* — Anh-Vinh T Nguyen
(74) *Attorney, Agent, or Firm* — Stein IP, LLC

(57) ABSTRACT

A communication apparatus has a first communicator, a second communicator, and a controller. The first communicator is assigned a first destination number. The second communicator is assigned a second destination number. For image transmission, during parameter adjustment processing for adjusting parameters of the waveform of a selection signal which is a signal transmitting a destination number of a communication partner to call, the controller makes the first communicator transmit a selection single of the second destination number. After the selection signal of the second destination number is transmitted, the controller judges whether or not the second communicator receives a call.

11 Claims, 6 Drawing Sheets

(56) References Cited

U.S. PATENT DOCUMENTS

| | | | | |
|---|---|---|---|---|
| 7,365,884 B2* | 4/2008 | Gordon | .............. | H04N 1/32037 358/400 |
| 2001/0033642 A1* | 10/2001 | Abrishami | ......... | H04N 1/32406 379/100.01 |
| 2008/0025213 A1* | 1/2008 | Gotou | .................... | H04L 47/50 370/229 |
| 2008/0192288 A1* | 8/2008 | Kitamura | ........... | H04N 1/00225 358/1.15 |
| 2009/0122331 A1* | 5/2009 | Yasui | ................ | H04N 1/33323 358/1.14 |
| 2010/0208852 A1* | 8/2010 | Feher | ................. | H04L 27/0008 375/343 |
| 2014/0119299 A1* | 5/2014 | Yasui | ................... | H04L 67/141 370/329 |
| 2018/0019926 A1* | 1/2018 | Yasui | ..................... | H04L 41/12 |
| 2018/0091701 A1* | 3/2018 | Kitayama | ............. | H04L 1/1678 |
| 2018/0124275 A1* | 5/2018 | Watanabe | .......... | H04N 1/32728 |
| 2019/0007565 A1* | 1/2019 | Cichielo | ................ | H04L 67/02 |
| 2019/0312682 A1* | 10/2019 | Nammi | ................ | H04L 1/1893 |
| 2019/0385057 A1* | 12/2019 | Litichever | ............... | G06N 3/08 |

\* cited by examiner

|  | HIGH FREQUENCY GROUP(Hz) | | |
|---|---|---|---|
|  | 1209 | 1336 | 1477 |
| LOW FREQUENCY GROUP(Hz) 697 | 1 | 2 | 3 |
| 770 | 4 | 5 | 6 |
| 852 | 7 | 8 | 9 |
| 941 | * | 0 | # |

| DIAL-PULSE | | | T1 |
|---|---|---|---|
| ORDER | MAKE RATE(%) | MINIMUM-PAUSE TIME(ms) | |
| 1 | A1 | B1 | |
| 2 | A2 | B2 | |
| ⋮ | ⋮ | ⋮ | |
| n | An | Bn | |
| DTMF | | | |
| ORDER | SIGNAL LEVEL | SIGNAL ON TIME (ms) | SIGNAL OFF TIME (ms) |
| 1 | C1 | D1 | E1 |
| 2 | C2 | D2 | E2 |
| ⋮ | ⋮ | ⋮ | ⋮ |
| n | Cn | Dn | En |

COMMUNICATION APPARATUS AND CONTROL METHOD THEREFOR

INCORPORATION BY REFERENCE

This application is based upon and claims the benefit of priority from the corresponding Japanese Patent Application No. 2018-230287 filed on Dec. 7, 2018, the entire contents of which are incorporated herein by reference.

BACKGROUND

The present disclosure relates to a communication apparatus for transmitting an image to a destination, and relates also to a method for controlling such a communication apparatus.

A facsimile machine transmits an image. A caller-side facsimile machine transmits image data to a receiver-side facsimile machine. If the waveform of a signal transmitted and received is disturbed, it is impossible to transmit and receive image data property. A facsimile machine (communication apparatus) that gives consideration to proper transmission and reception of image data as described below is known.

Specially, a known communication apparatus allows the caller side to connect to a line and to transmit data, and allows the receiver side to receive data, measure the reception level of a signal transmitted from the caller side to the receiver side immediately after connection to the line, judge whether or not the measured reception level reaches a predetermined value, and, if not, notify the caller side of a request signal for higher transmission level. This configuration is intended to prevent a communication error and a lowering of the communication speed due to a communication error.

For facsimile communication, a telephone network (land-line telephone line) which a telecommunications carrier provides is used. However, in recent years, facsimile communication is conducted increasingly by VoIP. Some VoIP adapters have characteristics different from those for a switchboard for a land-line telephone line (telecommunications carrier).

SUMMARY

According to the present disclosure, a communication apparatus includes a first communicator, a second communicator, and a controller. The first communicator is assigned a first destination number and conducts communication. The second communicator is assigned a second destination number and conducts communication. For image transmission, during parameter adjustment processing for adjusting parameters of the waveform of a selection signal which is a signal transmitting a destination number of a communication partner to call, the controller makes the first communicator transmit the selection signal of the second destination number. After the selection signal of the second destination number is transmitted, the controller judges whether or not the second communicator receives a call.

According to another aspect of the present disclosure, a method for controlling a communication apparatus includes: conducting communication by use of a first communicator assigned a first destination number; conducting communication by use of a second communicator assigned a second destination number; during parameter adjustment processing for adjusting parameters of the waveform of a selection signal which is a signal transmitting a destination number of a communication partner to cal for image transmission, making the first communicator transmit the selection signal of the second destination number; and judging whether or not the second communication receives a call after the selection signal of the second destination number is transmitted.

Further features and advantages of the present disclosure will become apparent from the description of embodiments given below.

DETAILED DESCRIPTION

In view of the above-mentioned problem, the present disclosure is aimed at checking whether or not a signal (selection signal) for selecting a destination for facsimile communication is accurately recognized in any environment. Hereinafter, with reference to FIGS. 1 to 8, an example of a communication apparatus (facsimile machine) according to an embodiment of the present disclosure will be described. The following description deals with a case where the communication apparatus is a multifunction peripheral 1 having the function of a facsimile machine. All features, in terms of structure and arrangement, described in connection with the following embodiments are merely examples for the sake of description, and are in no way meant to limit the scope of the disclosure.

Outline of Facsimile Communication System 100

Figure 1:
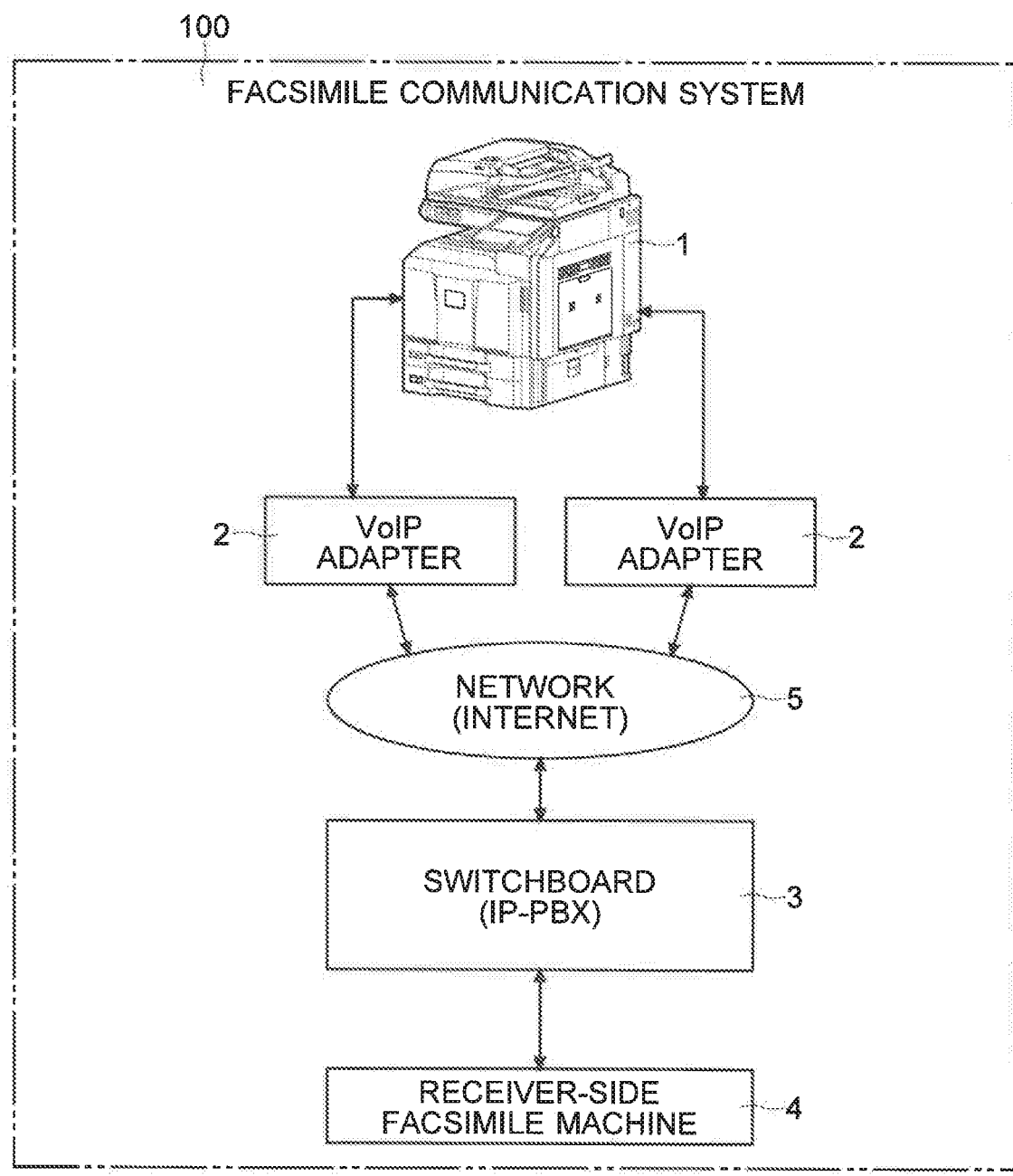
FIG. 1 is a diagram showing an example of a facsimile communication system according to the embodiment.

With reference to FIG. 1, an example of a facsimile communication system 100 according to the embodiment will be described. The facsimile communication system 100 shown in FIG. 1 includes a multifunction peripheral 1, a plurality of VoIP adapters 2, and a switchboard 3. The multifunction peripheral 1 has a plurality of functions integrated together. For example, the multifunction peripheral 1 has a facsimile communication function, a printing function, and a scanning transmission function. The multifunction peripheral 1 conducts facsimile communication in conformity with the ITU-T recommendation T. 30. The multifunction peripheral 1 can conduct facsimile communication by use of a land-line telephone line. The multifunction peripheral 1 transmits image data (a message, an image signal) based on image data of a document acquired by reading toward a receiver-side facsimile machine 4. The receiver-side facsimile machine 4 receives the data.

The multifunction peripheral 1 includes a plurality of modular jacks. Thus, the multifunction peripheral 1 can have a plurality of lines connected to it (multiport). The following description deals with an example of a multifunction peripheral 1 to which two lines can be connected. The multifunction peripheral 1 can instead be one to which three or more lines can be connected. In the facsimile communication system 100, one VoIP adapter 2 can be connected to each modular jack. The VoIP adapters 2 are connected to the switchboard 3 via a communication network 5 (the Internet). The switchboard 3 is communicably connected to the receiver-side facsimile machine 4.

In facsimile transmission, the VoIP adapters 2 convert a signal (audio signal) transmitted from the multifunction peripheral 1 into data (packets). The VoIP adapters 2 feed the converted data to the switchboard 3. The switchboard 3 transmits the data or the packets toward the receiver-side facsimile machine 4.

In facsimile reception, the switchboard 3 receives the packets which have been transmitted toward the multifunction peripheral 1 (addressed to the multifunction peripheral 1 as a destination). The switchboard 3 feeds the received packets to one of VoIP adapters 2. The VoIP adapter 2 converts the received packets into a signal in a form which the multifunction peripheral 1 can understand (a facsimile audio signal, a signal conforming to the ITU-T recommendation T. 30). The VoIP adapter 2 feeds the converted signal to the multifunction peripheral 1.

Multifunction Peripheral 1

Figure 2:
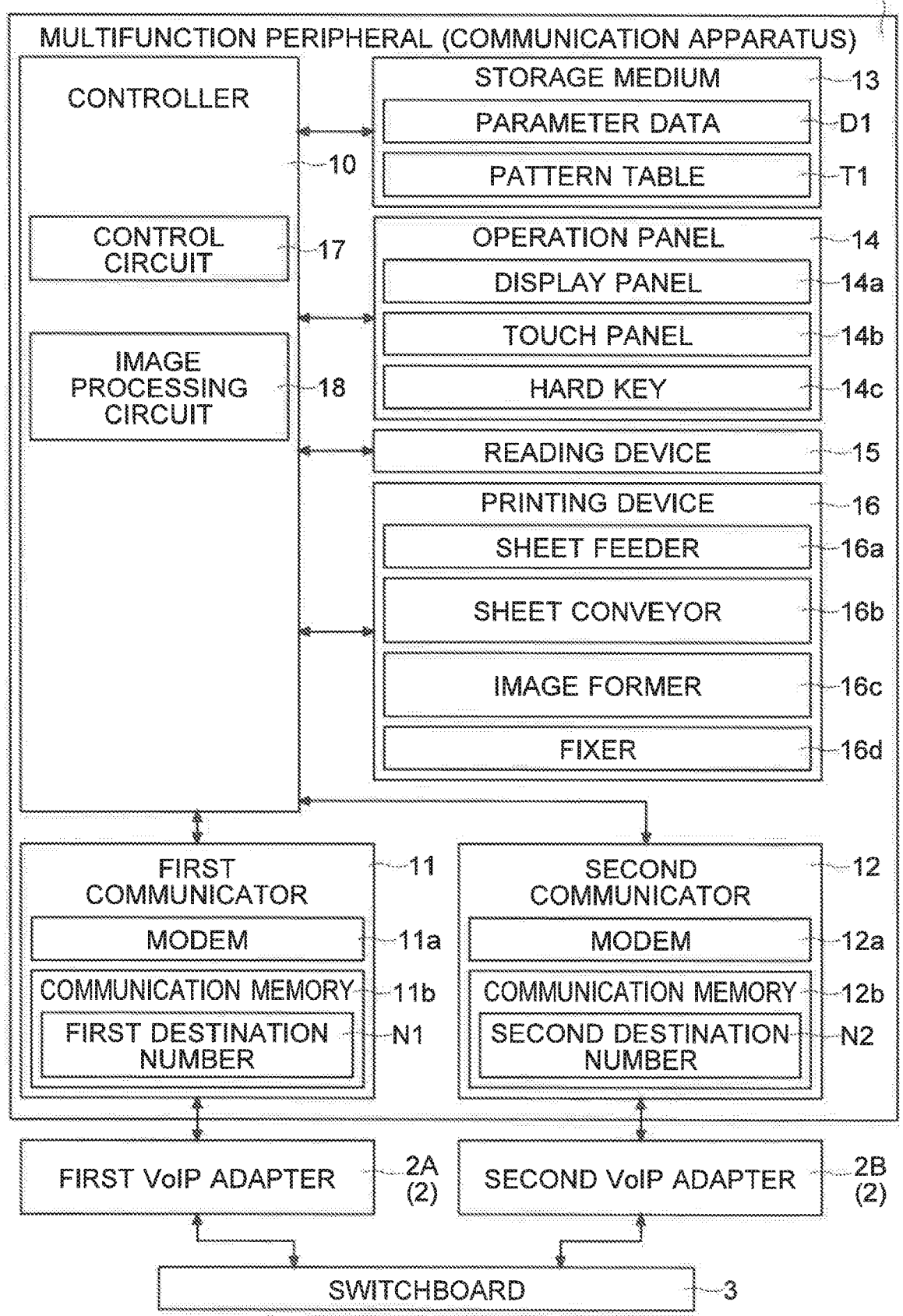
FIG. 2 is a diagram showing an example of a multifunction peripheral according to the embodiment.

Now, with reference to FIG. 2, an example of a multifunction peripheral 1 according to the embodiment will be described. The multifunction peripheral 1 includes a controller 10 (control device), a first communicator 11 (first communication circuit), a second communicator 12 (second communication circuit), a storage medium 13, an operation panel 14, a reading device 15, and a printing device 16. The controller 10 (processor) includes a control circuit 17 and an image processing circuit 18. The control circuit 17 is, for example, a CPU. The control circuit 17 performs calculation and control based on programs and data for control which are stored in the storage medium 13. The image processing circuit 18 can generate image data (an image signal) to be transmitted to the receiver-side facsimile machine 4. The storage medium 13 includes a ROM, a flash ROM, a RAM, and a HDD. The controller 10 controls the operation of the operation panel 14, the reading device 15, the printing device 16, the first communicator 11, and the second communicator 12.

The operation panel 14 includes a display panel 14a, a touch panel 14b, and hardware keys 14c. The display panel 14a displays messages and setting screens. The touch panel 14b is provided for the display panel 14a. A user can make settings related to facsimile transmission by use of the touch panel 14b and the hardware keys 14c. For example, a destination or a transmission size can be set. The operation panel 14 accepts setting for facsimile transmission.

The reading device 15 reads a document to generate image data of the document. The reading device 15 reads a document being conveyed or a document placed on a document stage. The printing device 16 includes a sheet feeder 16a, a sheet conveyor 16b, an image former 16c, and a fixer 16d. During printing, the controller 10 makes the sheet feeder 16a perform sheet feeding. The controller 10 makes the sheet conveyor 16b convey sheets within the apparatus. The controller 10 makes the image former 16c perform formation of a toner image and transferring of the toner image to a sheet. The controller 10 makes the fixer 16d fix the toner image to the sheet.

The controller 10 includes two communication portions. For the sake of convenience, one is referred to as a first communicator 11 and the other is referred to as a second communicator 12. The controller 10 (control circuit 17) controls communication processing of the first communicator 11. The first communicator 11 is a communication control board that performs facsimile communication. The first communicator 11 includes a circuit that communicates with the receiver-side facsimile machine 4 (the VoIP adapter 2, the switchboard 3). For example, the first communicator 11 includes a modem 11a. The first communicator 11 includes one connector (modular jack) for connecting a line (modular cable) to it. The modular cable connected to the connector is connected to the VoIP adapter 2. Thus, the first communicator 11 is connected to the VoIP adapter 2. Now, the VoIP adapter 2 connected to the first communicator 11 is referred to as a first VoIP adapter 2A.

The first communicator 11 transmits image data (a message, an image signal) to the receiver-side facsimile machine 4 (facsimile transmission). The first communicator 11 can receive data from other facsimile machines. Based on the received data, the controller 10 makes the printing device 16 print (a printer function, a facsimile reception function).

The controller 10 also controls communication processing by the second communicator 12. The second communicator 12 is a communication control board that performs facsimile communication. The second communicator 12 includes a circuit that communicates with the receiver-side facsimile machine 4 (the VoIP adapter 2, the switchboard 3). For example, the second communicator 12 includes a modem 12a. The second communicator 12 includes one connector (modular jack) for connecting a line (modular cable) to it. The modular cable connected to the connector is connected to the VoIP adapter 2. Thus, the second communicator 12 is connected to the VoIP adapter 2. Now, the VoIP adapter 2 connected to the second communicator 12 is referred to as a second VoIP adapter 2B.

The second communicator 12 transmits image data (a message, an image signal) to the receiver-side facsimile machine 4 (facsimile transmission). The second communicator 12 can receive data from other facsimile machines. Based on the received data, the controller 10 makes the printing device 16 print (a printer function, a facsimile reception function).

The first communicator 11 is assigned a first destination number N1 (facsimile number of the first communicator 11) as a destination. For example, a communication memory 11b in the first communicator 11 stores the first destination number N1 in a non-volatile manner. The second communicator 12 is assigned a second destination number N2 (facsimile number of the second communicator 12) as a destination. For example, a communication memory 12b in the second communicator 12 stores the second destination number N2 in a non-volatile manner.

The switchboard 3 stores the first and second destination numbers N1 and N2. On receiving data addressed to the first communicator 11 as the destination (data for the first destination number N1), the switchboard 3 feeds the received data to the first communicator 11 via the first VoIP adapter 2A. On receiving data addressed to the second communicator 12 as the destination (data for the second destination number N2), the switchboard 3 feeds the received data to the second communicator 12 via the second VoIP adapter 2B.

Automatic Adjustment of Parameters of Waveform of Selection Signal 7

Next, with reference to FIGS. 3 to 7, an example of parameter adjustment processing for parameters of the waveform of a selection signal 7 in the multifunction peripheral 1 according to the embodiment will be described. After facsimile transmission is started, in a first phase (phase A, call origination), the multifunction peripheral 1 (facsimile machine) transmits the selection signal 7. The selection signal 7 is transmitted before communication for discriminating performance, instructing on selected conditions, and checking conditions to be accepted (phase B), and transmission of a message (phase C).

The selection signal 7 is a signal for selecting a communication partner. Specifically, the selection signal 7 is a signal indicating a facsimile number of a destination facsimile machine (a signal indicating a destination number of a communication partner to cal, a destination subscriber number). The selection signal 7 may be referred to as a dial signal. The selection signal 7 may be transmitted by a dial-pulse method or by a DTMF (tone-signal, push-signal) method.

Based on the selection signal 7, the switchboard 3 and the communication network 5 recognize a facsimile machine as a communication partner. The switchboard 3 and the communication network 5 connect together the facsimile machine corresponding to the destination number and a transmitter-side facsimile machine. Then, the transmitter-side facsimile machine transmits an image signal to the partner facsimile machine.

When facsimile machines were first introduced, land-line telephone lines (wired telephone line) were used as communication line. However, in recent years, facsimile communication is conducted increasingly by use of the VoIP technology. When facsimile communication is conducted by VoIP, an adopter for VoIP communication is connected to facsimile machines.

Facsimile machines are conventionally designed and assumed to use land-line telephone lines. Thus, the characteristics (for example, impedance, response time) of the communication circuit are set with consideration given to land-line telephone lines or switchboards for land-line telephone lines. On the other hand, some adapters have circuit characteristics different from those for switchboards for land-line telephone lines. When an adapter with different characteristics is used, the adapter and the switchboard connected to it may not recognize the selection signal 7. When no recognition is achieved, no call to the partner facsimile machine is performed so that no response comes from the partner facsimile machine. As a result, a communication error occurs.

To avoid that, the multifunction peripheral 1 performs parameter adjustment processing. Parameter adjustment processing is a process to automatically adjust parameters of the waveform of the selection signal 7. In this process, the controller 10 (control circuit 17) adjusts parameters of the waveform so that the VoIP adapter 2 and the switchboard 3 for VoIP can understand (detect, recognize) the selection signal 7. Now, an example of the flow of adjustment will be described.

Figure 3:
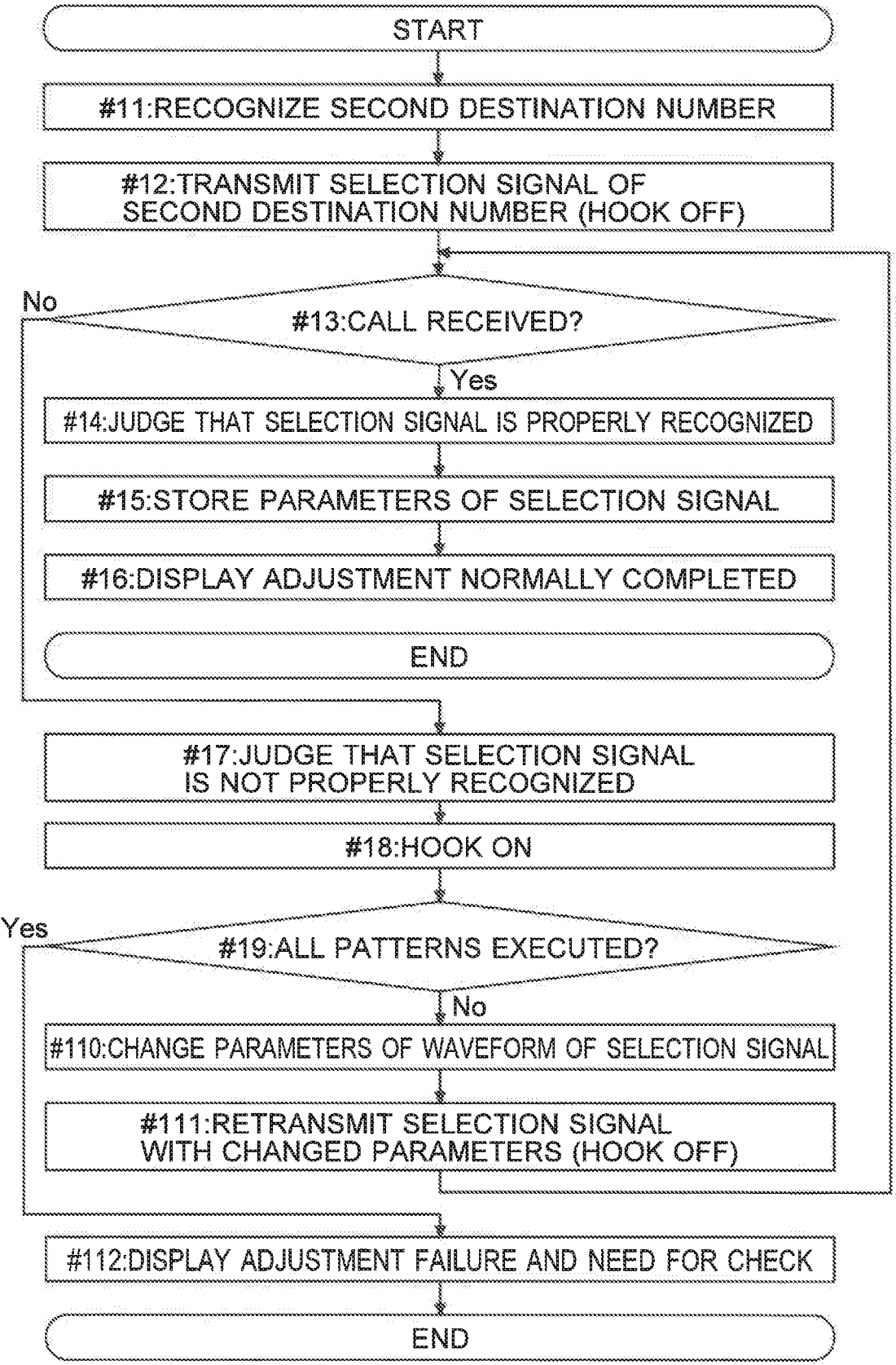
FIG. 3 is a diagram showing an example of parameter adjustment processing for parameters of the waveform of a selection signal in the multifunction peripheral according to the embodiment.

First, the flow in FIG. 3 starts when parameter adjustment processing is started. The operation panel 14 accepts the start of parameter adjustment processing. When the operation panel 14 accepts the start of parameter adjustment processing, the controller 10 (control circuit 17) starts the flow in FIG. 3. For example, when the multifunction peripheral 1 is newly installed, parameter adjustment processing is performed.

The controller 10 (control circuit 17) recognizes the second destination number N2 (facsimile number) of the second communicator 12 (step #11). For example, when parameter adjustment processing is started, the operation panel 14 accepts input of the second destination number N2. In this case, the controller 10 recognizes the input number as the second destination number N2. The operation panel 14 may accept input of the first destination number N1 as well. Thus, the controller 10 can confirm that the communication portion for adjusting parameters of the waveform is the first communicator 11.

Next, the controller 10 (control circuit 17) performs a hook-off (establishes line connection) and makes the first communicator 11 transmit the selection signal 7 of the second destination number N2 (step #12). In other words, the controller 10 makes the first communicator 11 transmit a signal for calling the second communicator 12. In first transmission of the test, the controller 10 makes the first communicator 11 transmit the selection signal 7 with a default waveform.

Then, the controller 10 (control circuit 17) checks whether or not the second communicator 12 is receiving a call (step #13). In other words, the controller 10 judges whether or not the second communicator 12 is receiving a call from the first communicator 11 (first destination number N1).

When the first VoIP adapter 2A succeeds in recognizing the selection signal 7 from the first communicator 11, the first VoIP adapter 2A notifies the switchboard 3 of receipt of a call and the second destination number N2. Based on the second destination number N2, the switchboard 3 instructs the second VoIP adapter 2B to perform ringing in (input a call signal to) the second communicator 12. As a result, the second communicator 12 recognizes an incoming call. In other words, the second communicator 12 receives a call.

Specifically, after the selection signal 7 of the second destination number N2 is transmitted, the controller 10 (control circuit 17) checks whether or not the second communicator 12 has received a call within a previously determined wait time. When a call is received within the wait time, the controller 10 judges that a call is received from the first communicator 11. When no call is received within the wait time, the controller 10 judges that no cal is received from the first communicator 11. The wait time is, for example, several seconds to ten and several seconds.

When it is judged that a call is received from the first communicator 11 (step #13, Yes), the controller 10 (control circuit 17) judges that the first VoIP adapter 2A has properly recognized (detected) the selection signal 7 (second destination number N2) (step #14). Here, the controller 10 (control circuit 17) makes the storage medium 13 store parameter data D1 (step #15, see FIG. 2). The parameter data D1 indicates parameters of the most recently transmitted selection signal 7.

Then, the controller 10 (control circuit 17) ends parameter adjustment processing for the first communicator 11 (END). Before parameter adjustment processing, the controller 10 (control circuit 17) can make the display panel 14a display a message notifying that the waveform (parameters) of the signal indicating the destination number has been adjusted. For example, the controller 10 makes the display panel 14a display a screen including a message saying that adjustment has been normally completed (step #16).

While transmitting the selection signal 7 by the dial-pulse method, the controller 10 generates parameter data D1 including a make rate and a minimum-pause time of the selection signal 7 as observed when the judgement that an incoming call was received was possible. The dial-pulse method uses a signal indicating numbers based on the number of times of turning on and off the current passing through a line. The make rate is the proportion of the make time to the sum of the make time (high level) and the break time (low level) of one pulse (make time/(make time+break time)). The minimum-pause time is a time which is secured between numbers (between pulse trains).

Figures 4, 5:
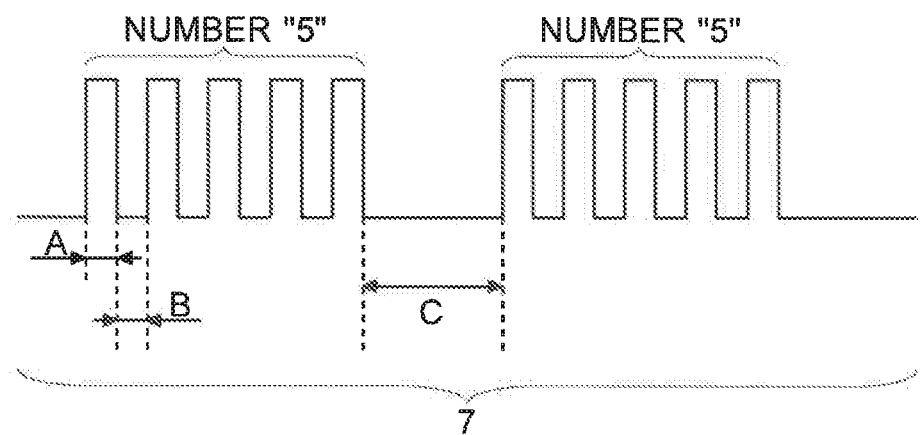
FIG. 4 is a diagram showing an example of a dial-pulse method according to the embodiment.
FIG. 5 is a diagram showing an example of a DTMF method according to the embodiment.

FIG. 4 is a diagram showing an example of the dial-pulse method. FIG. 4 shows an example where a selection signal 7 including two consecutive "fives" is transmitted as a part of a destination number. In FIG. 4, A indicates the make time. B indicates the break time. C indicates the minimum-pause time. FIG. 5 is a diagram showing an example of how numbers are represented in a DTMF method. While transmitting the selection signal 7 by the DTMF method, the controller 10 generates parameter data D1 including a signal level, a signal ON time, and a signal OFF time of the selection signal 7 as observed when the judgement that an incoming call was received was possible. The DTMF method uses a signal that transmits numbers with synthetic sound having sine-waves with two different frequencies mixed together. The signal level is the electric power that is used to transmit the signal. The signal ON time is the time in which the synthetic sound is transmitted. The signal OFF time is the blank time after the synthetic sound is transmitted until it is transmitted next time.

Then, when originating a call, the controller 10 (control circuit 17) makes the first communicator 11 transmit the selection signal 7 based on the parameter data D1. A signal with parameters which the VoIP adapter 2 and the switchboard 3 for VoIP can recognize is transmitted. When a destination number is conveyed to the first VoIP adapter 2A, the controller 10 makes the first communicator 11 transmit the selection signal 7 with a waveform according to the parameters stored.

When the first VoIP adapter 2A succeeds in property recognizing the selection signal 7, the first VoIP adapter 2A conveys the recognized selection signal 7 to the switchboard 3. When the switchboard 3 receives the selection signal 7, the switchboard 3 instructs the second VoIP adapter 2B to respond to a call. The second VoIP adapter 2B feeds out a ringing signal to the second communicator 12. The second communicator 12 detects, with a detector, the ringing signal and receives the call. On the other hand, when the first VoIP adapter 2A does not succeed in property recognizing the selection signal 7, the first VoIP adapter 2A does not convey the selection signal 7 to the switchboard 3. In this case, the second VoIP adapter 2B does not feed out the ringing signal to the second communicator 12.

When it is judged that no call is received from the first communicator 11 (step #13, No), the controller 10 (control circuit 17) judges that the first VoIP adapter 2A has not succeeded in properly recognizing (detecting) the selection signal 7 (second destination number N2) (step #17). When no proper recognition has been achieved, the controller 10 (control circuit 17) tentatively performs a hook-on (step #18).

Next, the controller 10 (control circuit 17) checks whether or not all patterns of parameters of the selection signal 7 have been executed (step #19). In other words, the controller 10 checks whether or not all patterns have failed. When not all patterns have been executed yet (step #19, No), the controller 10 (control circuit 17) changes parameters of the waveform of the selection signal 7 (step #110).

The controller 10 (control circuit 17) performs a hook-off (establishes line connection) and makes the first communicator 11 retransmit the selection signal 7 (second destination number N2) of which parameters (waveforms) have been changed (step #111). That is, when retransmitting, the controller 10 makes parameters different from those for the most recently transmitted selection signal 7. Then, the controller 10 (control circuit 17) performs step #13 (returns to step #13). Until the waveform becomes one that permits the first VoIP adapter 2A and the switchboard 3 to recognize the selection signal 7, adjustment of parameters (waveform) of the selection signal 7 is automatically repeated. When retransmission is repeated until an incoming call can be recognized, the controller 10 (control circuit 17) makes the first communicator 11 transmit a selection signal 7 having different parameters (waveform) in each repetition of retransmission.

Figures 6, 7:
FIG. 6 shows an example of a pattern table according to the embodiment.
FIG. 7 shows an example of a notification screen according to the embodiment.

With reference to FIGS. 1 and 6, patterns of parameters will be described. The storage medium 13 stores a pattern table T1 in a non-volatile manner. The pattern table T1 is data in which combinations (patterns) of parameters of the waveform of the selection signal 7 is defined. Based on the pattern table T1, when retransmitting, the controller 10 (control circuit 17) changes parameters of the selection signal 7.

FIG. 6 shows an example of the pattern table T1. In the pattern table T1, for the dial-pulse method, a plurality of combinations of parameters are defined. Also for the DTMF method, a plurality of combinations of parameters are defined. The order of executing those patterns is set FIG. 6 shows a pattern table T1 in which pattern in the first to nth places in order are defined. Here, n can be set as desired. For example, n can be any integer from 5 to 15 (for example, n=10). Values are set such that the waveform of the selection signal 7 differs from place to place in order.

When the selection signal 7 of the second destination number N2 is transmitted first in parameter adjustment processing, the controller 10 (control circuit 17) makes the first communicator 11 transmit, for example, the selection signal 7 with the parameters in the first place in the pattern table T1.

For the dial-pulse method, the make rate in the parameters in the first place is set at a previously determined reference make rate. For example in FIG. 6, μl represents the reference make rate. The reference make rate can be a reference value in a standard. For example, the reference make rate is 40%. In the second and the following places, the make rate can be set at values different from the reference make rate. For example, in even-numbered places in order, the make rate is set at values higher than the reference make rate. In the third and the following odd-numbered places, the make rate is set at values lower than the reference make rate. The values may be so set that, the later the place in order, the larger the absolute value of their difference from the reference make rate. This results in a pattern table T1 in which, from one place to the next in order, the make rate rises and falls while the difference from the reference make rate increases constantly.

For the dial-pulse method, the minimum-pause time in the parameters in the first place can be the minimum time in the standard. The minimum-pause time is short, and this may make it impossible to properly recognize the selection signal 7 (destination number). To avoid that, the minimum-pause time may be so set that, the later the place in order, the longer the minimum-pause time. This results in a pattern table T1 in which, from one place to the next in order, the minimum-pause time is increasingly long.

For the DTMF method, the signal level in the parameters in the first place is set at a previously determined reference signal level. The reference signal level can be a reference value in a standard. In the second and the following places, the signal level can be set at values equal to or different from the reference signal level. For example, in even-numbered places in order, the signal level is set at values different from the reference signal level. In the third and the following odd-numbered places, the signal level is set at values equal to the reference signal level. This results in a pattern table T1 in which the signal level rises and falls while the waveform of the selection signal 7 is adjusted.

For the DTMF method, the signal ON time in the parameters in the first place can be the minimum time in the standard. The signal ON time is short, and this may make it impossible to properly recognize the selection signal 7 (destination number). To avoid that, the signal ON time may be so set that, the later the place in order, the longer the signal ON time. This results in a pattern table T1 in which, from one place to the next in order, the signal ON time is increasingly long.

For the DTMF method, the signal OFF time (OFF time) in the parameters in the first place can be the minimum time in the standard. The signal OFF time is short, and this may make it impossible to properly recognize the selection signal 7 (destination number). To avoid that, the signal OFF time may be so set that, the later the place in order, the longer the signal OFF time. This results in a pattern table T1 in which, from one place to the next in order, the signal OFF time is increasingly long.

When retransmitting the selection signal 7, the controller 10 (control circuit 17) reads the values of the parameters in an untried place in order in the pattern table T1. For example, the controller 10 reads the value of the parameters in the next place in order (next line) in the pattern table T1. The controller 10 makes the first communicator 11 retransmit the selection signal 7 with a waveform according to the read values.

When, despite all patterns having been executed, the first communicator 11 cannot detect an incoming call (step #19, Yes), a fault is suspected in an adapter, a switchboard, or a modular cable. Thus, the controller 10 (control circuit 17) makes the display panel 14a display adjustment failure and the need for a check (step #112). Then, the controller 10 (control circuit 17) ends parameter adjustment processing for the first communicator 11 (END).

FIG. 7 shows an example of a notification screen 6. Based on step #112, the controller 10 (control circuit 17) makes the display panel 14a display the notification screen 6. To allow a user to recognize the communication portion in which adjustment has failed, the controller 10 may display the first destination number N1 (facsimile number). As shown in FIG. 7, the controller 10 makes the display panel 14a display a message for notifying a user that it was impossible to adjust the first communicator 11 to properly recognize a destination number. The controller 10 makes the display panel 14a display also a message for notifying a user of a possibility of failure in the first VoIP adapter 2A, the switchboard 3, or the modular cable and the need to check them.

Adjustment of Second Communicator 12

Figure 8:
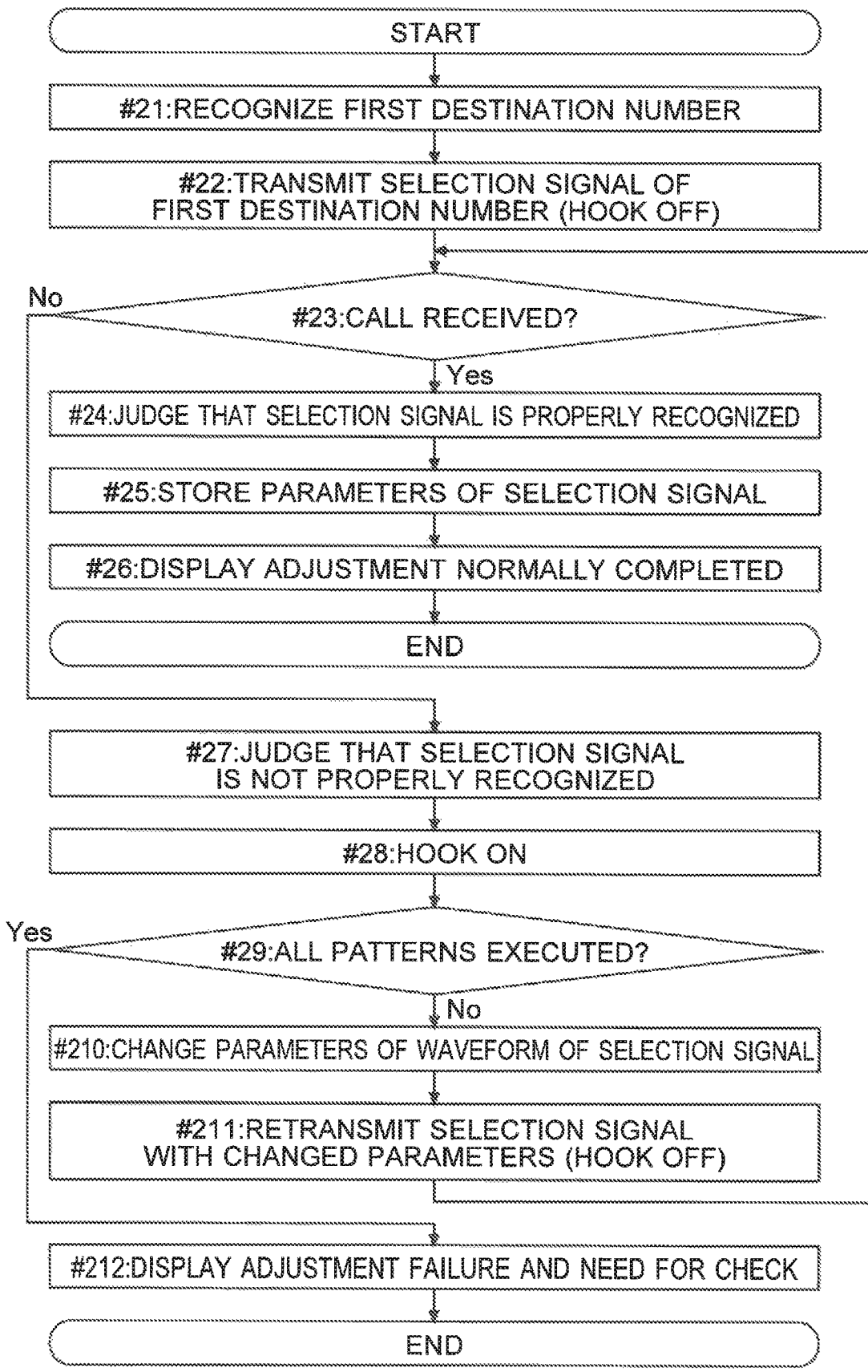
FIG. 8 is a diagram showing an example of parameter adjustment processing for the second communicator according to the embodiment.

With reference to FIG. 8, an example of parameter adjustment processing for the second communicator 12 according to the embodiment will be described. When parameter adjustment processing for the first communicator 11 ends, the controller 10 (control circuit 17) starts parameter adjustment processing also for the second communicator 12. The flow in FIG. 8 starts when parameter adjustment processing for first communicator 11 ends. The controller 10 may start processing in FIG. 8 only when the parameters (waveform) of the selection signal 7 of the first communicator 11 have been adjusted to achieve proper recognition.

In parameter adjustment processing for the second communicator 12, the controller 10 performs a process similar to parameter adjustment processing for the first communicator 11. In parameter adjustment processing for the first communicator 11, the caller is the first communicator 11, and the receiver is the second communicator 12. In parameter adjustment processing for the second communicator 12, the caller is the second communicator 12, and the receiver is the first communicator 11.

The controller 10 (control circuit 17) recognizes the first destination number N1 (facsimile number) of the first communicator 11 (step #21). For example, when parameter adjustment processing is started, the operation panel 14 accepts input of the first destination number N1. In this case, the controller 10 recognizes the input number as the first destination number N1. At step #11 in FIG. 3, Input of the first destination number N1 may have been performed.

Next, the controller 10 (control circuit 17) performs a hook-off (establishes line connection) and makes the second communicator 12 transmit the selection signal 7 of the first destination number N1 (step #22). In other words, the controller 10 makes the second communicator 12 transmit a signal for calling the first communicator 11.

Here, the controller 10 may check whether or not the parameters (waveform) of the selection signal 7 of the first communicator 11 have been adjusted to achieve proper recognition. When the parameters have been adjusted, the controller 10 refers to parameter data D1 at the time of successful recognition of the selection signal 7 from the first communicator 11. The controller 10 may make the second communicator 12 transmit first the selection signal 7 with the same parameters as those of the selection signal 7 properly recognized.

The controller 10 (control circuit 17) checks whether or not the first communicator 11 is receiving a call (step #23). In other words, the controller 10 judges whether or not the first communicator 11 is receiving a call from the second communicator 12 (second destination number N2).

When the second VoIP adapter 2B succeeds in recognizing the selection signal 7 from the second communicator 12, the second VoIP adapter 2B notifies the switchboard 3 of receipt of a cal and the first destination number N1. Based on the first destination number N1, the switchboard 3 instructs the first VoIP adapter 2A to perform ringing in (input a ringing signal, a call signal to) the first communicator 11. As a result, the first communicator 11 recognizes an incoming call. In other words, the first communicator 11 receives a call.

After the selection signal 7 of the first destination number N1 is transmitted, the controller 10 (control circuit 17) checks whether or not the first communicator 11 has received a call within a predetermined wait time. When a call is received within the wait time, the controller 10 judges that a call (a call from the second communicator 12) is received. When no call is received within the wait time, the controller 10 judges that no call is received.

When it is judged that a call is received (step #23, Yes), the controller 10 (control circuit 17) judges that the second VoIP adapter 2B has properly recognized the selection signal 7 (first destination number N1) (step #24). Here, the controller 10 (control circuit 17) makes the storage medium 13 store parameters of the selection signal 7 most recently transmitted by the second communicator 12 as parameter data D1 (step #25). Then, the controller 10 (control circuit 17) ends parameter adjustment processing for the second communicator 12 (END). Before the end, the controller 10 (control circuit 17) may make the display panel 14a display a message for notifying a user that parameters of the signal of the second communicator 12 have been adjusted. In this case, the controller 10 makes the display panel 14a display a screen including a message saying that adjustment has been normally completed (step #26).

While the second communicator 12 is transmitting the selection signal 7 by the dial-pulse method, the controller 10 makes the storage medium 13 store parameter data D1 including a make rate and a minimum-pause time of the selection signal 7 as observed when the judgement that an incoming call was received was possible. While the second communicator 12 is transmitting the selection signal 7 by the DTMF method, the controller 10 makes the storage medium 13 store parameter data D1 including a signal level, a signal ON time, a signal OFF time, and a period (the sum of the signal ON time and the signal OFF time) of the selection signal 7 as observed when the judgement that an incoming call was received was possible.

Then, when originating a call, the controller 10 (control circuit 17) makes the second communicator 12 transmit the selection signal 7 based on the parameters stored in the storage medium 13 (parameter data D1 of the second communicator 12). When a destination number is conveyed to the second VoIP adapter 2B, the controller 10 makes the second communicator 12 transmit the selection signal 7 with a waveform according to the parameters stored.

When the second VoIP adapter 2B succeeds in properly recognizing the selection signal 7, the second VoIP adapter 2B conveys the recognized selection signal 7 to the switchboard 3. When the switchboard 3 receives the selection signal 7, the switchboard 3 instructs the first VoIP adapter 2A to respond to a call. The first VoIP adapter 2A feeds out a ringing signal to the first communicator 11. The first communicator 11 detects, with a detector, the ringing signal and receives the call. On the other hand, when the second VoIP adapter 2B does not succeed in properly recognizing the selection signal 7, the second VoIP adapter 2B does not convey the selection signal 7 to the switchboard 3. In this case, the first VoIP adapter 2A does not feed out the ringing signal to the first communicator 11.

When it is judged that no call is received from the second communicator 12 (step #23, No), the controller 10 (control circuit 17) judges that the second VoIP adapter 2B has not succeeded in properly recognizing (detecting) the selection signal 7 (first destination number N1) (step #27). When no proper recognition has been achieved, the controller 10 (control circuit 17) tentatively performs a hook-on (step #28).

The controller 10 (control circuit 17) checks whether or not all patterns of parameters of the selection signal 7 have been executed (step #29). As with the first communicator 11, the controller 10 changes parameters of the selection signal 7 by use of the pattern table T1. The pattern table T1 used may be the same as that for the first communicator 11. When not all patterns have been executed yet (step #29, No), the controller 10 (control circuit 17) changes parameters of the waveform of the selection signal 7 (step #210). Untried parameters are selected.

The controller 10 (control circuit 17) performs a hook-off (establishes line connection) and makes the second communicator 12 retransmit the selection signal 7 (first destination number N1) of which parameters have been changed (step #211). When retransmitting, the controller 10 makes parameters different from those for the most recently transmitted selection signal 7.

The controller 10 (control circuit 17) performs step #23 (returns to step #23). Thus, until the waveform becomes one that permits the second VoIP adapter 2B and the switchboard 3 to recognize the selection signal 7, adjustment of parameters is automatically repeated. When retransmission is repeated until a judgement that an incoming call is received is possible, the controller 10 (control circuit 17) makes the second communicator 12 transmit a selection signal 7 having different parameters (waveform) in each repetition of retransmission.

When, despite all patterns having been executed, the first communicator 11 cannot detect an incoming call (step #29, Yes), the controller 10 (control circuit 17) makes the display panel 14a display adjustment failure and the need for a check (step #212). Then, the controller 10 (control circuit 17) ends parameter adjustment processing for the second communicator 12 (END). The controller 10 makes the display panel 14a display a notification screen 6 similar to that in FIG. 7. To allow a user to recognize the communication portion that has failed in adjustment, the controller 10 may display the destination number (facsimile number) of the second communicator 12.

As described above, the communication apparatus (multifunction peripheral 1, facsimile machine) according to the embodiment includes a first communicator 11, a second communicator 12, and a controller 10. The first communicator 11 is assigned a first destination number N1 and conducts communication. The second communicator 12 is assigned a second destination number N2 and conducts communication. For image transmission, during parameter adjustment processing for adjusting the parameters of the waveform of a selection signal 7 which is a signal transmitting the destination number of a communication partner to call, the controller 10 makes the first communicator 11 transmit the selection signal 7 of the second destination number N2. After the selection signal 7 of the second destination number N2 is transmitted, the controller 10 judges whether or not the second communicator 12 receives a call.

It is possible to judge whether or not an adapter and a switchboard 3 properly recognize a signal (selection signal 7) indicating a destination number. It is possible to check whether or not a destination number is transmitted so that the adapter and the switchboard 3 can recognize it. The maintenance staff does not have to manually adjust the parameters of the signal. It is possible to automatically set appropriate parameters for the selection signal 7. When checking, the maintenance staff has only to perform test transmission to the second communicator 12 (second destination number N2) of the apparatus at hand, and this requires no extra communication cost.

The multifunction peripheral 1 includes a storage medium 13. After the selection signal 7 of the second destination number N2 is transmitted from the first communicator 11, when it is judged that the second communicator 12 receives a call, the controller 10 makes the storage medium 13 store the parameters (parameter data D1) of the most recently transmitted selection signal 7. Based on the parameters stored in the storage medium 13, the controller 10 makes the first communicator 11 transmit the selection signal 7. Then, it is possible to transmit the selection signal 7 with a waveform which the adapter can recognize.

After the selection signal 7 of the second destination number N2 is transmitted from the first communicator 11, when it is judged that the second communicator 12 does not receive a call, the controller 10 makes the first communicator 11 perform retransmission of the selection signal 7 of the second destination number N2. For the retransmission, the controller 10 changes the parameters from the parameters of the most recently transmitted selection signal 7. By performing the retransmission of the selection signal 7 (second destination number N2) of which parameters have been changed, it is possible to automatically check again whether or not the switchboard and the adapter can properly recognize the selection signal 7. It is thus possible to perform the retransmission without imposing trouble on a user.

When it is judged that the second communicator 12 does not receive a call after the retransmission, the controller 10 makes the first communicator 11 perform the retransmission again (retransmission is repeated). The controller 10 changes the parameters of the selection signal 7 for the respective retransmission. It s possible to repeat the retransmission of the selection signal 7 (second destination number N2) while automatically changing the parameters (waveform) of the selection signal 7. It is possible to find out a signal waveform which the switchboard and the adapter property recognize. The retransmission is automatically repeated. It is thus possible to repeat the retransmission without imposing trouble on a user.

The multifunction peripheral 1 includes a display panel 14a that performs display. When the retransmission is repeated, based on a pattern table T1 in which patterns of the parameters are defined, the controller 10 changes the parameters of the selection signal 7 for the respective retransmission. When, even after the retransmission is performed with all the patterns defined in the pattern table T1, it is judged the second communicator 12 does not receive a call, the controller 10 makes the display panel 14a display adjustment failure and the need for a check. When, even the selection signal 7 with various waveforms is transmitted, no correct destination number is recognized, it is possible to notify a user of a fault. It is thus possible to notify a user of the need for a check of the switchboard 3 and the adapter.

When the first communicator 11 transmits the selection signal 7 by a dial-pulse method, for the retransmission, the controller 10 makes the first communicator 11 change either one or both of a make rate and a minimum-pause time in the parameters. For each transmission, it is possible to change the signal waveform of the transmitted selection signal 7 (second destination number N2). It is possible to find out the waveform for the dial-pulse method which the switchboard and the adapter recognize.

When the first communicator 11 transmits the second destination number N2 by a DTMF method, for the retransmission, the controller 10 makes the first communicator 11 change either one or a plurality of a signal level, a signal ON time, and a signal OFF time in the parameters. For each transmission, it is possible to change the signal waveform of the transmitted selection signal 7 (second destination number N2). It is possible to find out the waveform for the DTMF method which the switchboard and the adapter recognize.

The first and second communicators 11 and 12 are connected to VoIP adapters 2 (a first VoIP adapter 2A, a second VoIP adapter 2B). Under the VoIP environment, it is possible to judge whether or not the switchboard 3 and the VoIP adapter 2 properly recognize the selection signal 7.

When it is judged the second communicator 12 receives a cal, the controller 10 starts parameter adjustment processing for the second communicator 12. The controller 10 makes the second communicator 12 transmit the selection signal 7 of the first destination number N1. After the selection signal 7 of the first destination number N1 is transmitted, the controller 10 judges whether or not the first communicator 11 receives a call. After first parameter adjustment processing is performed, it is possible to interchange the roles of the first communicator 11 and the second communicator 12. It is possible to judge whether or not the switchboard and the adapter property recognize the selection signal 7 transmitted from the second communicator 12.

After the selection signal 7 of the first destination number N1 is transmitted from the second communicator 12, when it is judged that the first communicator 11 receives a call, the controller 10 makes the storage medium 13 store the parameters of the most recently transmitted selection signal 7. Based on the parameters stored in the storage medium 13, the controller 10 makes the second communicator 12 transmit the selection signal 7. Then, it is possible to transmit the selection signal 7 with a waveform which the switchboard and the adapter can recognize.

After the selection signal 7 of the first destination number N1 is transmitted from the second communicator 12, when it is judged that the first communicator 11 does not receive a call, the controller 10 makes the second communicator 12 perform retransmission of the selection signal 7 of the first destination number N1. For the retransmission, the controller 10 changes the parameters from the parameters of the most recently transmitted selection signal 7. It is thus possible to perform the retransmission without imposing trouble on a user.

When it is judged that the first communicator 11 does not receive a cal after the retransmission, the controller 10 makes the second communicator 12 perform the retransmission again. The controller 10 changes the parameters of the selection signal 7 for the respective retransmission. It is possible to find out a signal waveform which the switchboard and the adapter properly recognize.

When the retransmission is repeated, based on the patter table T1 in which patterns of the parameters are defined, the controller 10 changes the parameters of the selection signal 7 for the respective retransmission. When, even after the retransmission is performed with all the patterns defined in the pattern table T1, it is judged the first communicator 11 does not receive a call, the controller 10 makes the display panel 14a display adjustment failure and the need for a check. It is thus possible to notify a user of a fault.

When the second communicator 12 transmits the selection signal 7 of the first destination number N1 by the dial-pulse method, for the retransmission, the controller 10 makes the second communicator 12 change either one or both of the make rate and the minimum-pause time in the parameters. It is possible to find out the waveform for the dial-pulse method which the switchboard and the adapter recognize.

When the second communicator 12 transmits the selection signal 7 of the first destination number N1 by the DTMF method, for the retransmission, the controller 10 makes the second communicator 12 change either one or a plurality of the signal level, the signal ON time, and the signal OFF time in the parameters. It is possible to find out the waveform for the DTMF method which the switchboard and the adapter recognize.

It should be understood that the embodiments of the present disclosure described above are in no way meant to limit its scope; the present disclosure can be implemented with any modifications mode without departing from its spirit.

The present disclosure finds application in facsimile communication.

What is claimed is:

1. A communication apparatus comprising:
   a first communicator that is assigned a first destination number, the first communicator including a modem;
   a second communicator that is assigned a second destination number, the second communicator including a modem; and a controller that
   during parameter adjustment processing for adjusting parameters of a waveform of a selection signal which is a signal transmitting a destination number of a communication partner to call for image transmission,
   makes the first communicator transmit the selection signal of the second destination number, and
   judges whether or not the second communicator receives a call after the selection signal of the second destination number is transmitted,
wherein
after the selection signal of the second destination number is transmitted from the first communicator, when it is judged that the second communicator does not receive a call,
the controller
   makes the first communicator perform retransmission of the selection signal of the second destination number, and
      changes, for the retransmission, the parameters from the parameters of the most recently transmitted selection signal, and
when the first communicator transmits the selection signal of the second destination number by a dial-pulse method,
for the retransmission,
the controller makes the first communicator change either one or both of a make rate and a minimum-pause time in the parameters.

2. The communication apparatus according to claim 1, further comprising:
a storage medium,
wherein
after the selection signal of the second destination number is transmitted from the first communicator, when it is judged that the second communicator receives a call,
the controller
   makes the storage medium store the parameters of the most recently transmitted selection signal, and
   makes the first communicator transmit the selection signal based on the parameters stored in the storage medium.

3. The communication apparatus according to claim 1, wherein
the controller
   makes the first communicator perform the retransmission again when it is judged that the second communicator does not receive a call after the retransmission, and
   changes the parameters of the selection signal for the respective retransmission.

4. The communication apparatus according to claim 3, further comprising:
a display panel that performs display,
wherein
when the retransmission is repeated,
the controller
   changes the parameters of the selection signal for the respective retransmission based on a pattern table in which patterns of the parameters are defined, and
   makes the display panel display adjustment failure and a need for a check when, even after the retransmission is performed with all the patterns defined in the pattern table, it is judged the second communicator does not receive a call.

5. The communication apparatus according to claim 1, wherein
when the first communicator transmits the selection signal of the second destination number by a DTMF method,
for the retransmission,
the controller makes the first communicator change either one or a plurality of a signal level, a signal ON time, and a signal OFF time in the parameters.

6. The communication apparatus according to claim 1, wherein
the first and second communicators are connected to a VoIP adapter.

7. A communication apparatus comprising:
a first communicator that is assigned a first destination number, the first communicator including a modem;
a second communicator that is assigned a second destination number, the second communicator including a modem; and
a controller that
   during parameter adjustment processing for adjusting parameters of a waveform of a selection signal which is a signal transmitting a destination number of a communication partner to call for image transmission,
   makes the first communicator transmit the selection signal of the second destination number, and
      judges whether or not the second communicator receives a call after the selection signal of the second destination number is transmitted,
   wherein
when it is judged that the second communicator receives a call,
the controller
   starts the parameter adjustment processing for the second communicator,
   makes the second communicator transmit the selection signal of the first destination number, and
      judges whether or not the first communicator receives a call after the selection signal of the first destination number is transmitted,
after the selection signal of the first destination number is transmitted from the second communicator, when it is judged that the first communicator does not receive a call,
the controller
   makes the second communicator perform retransmission of the selection signal of the first destination number, and
      changes, for the retransmission, the parameters from the parameters of the most recently transmitted selection signal, and
when the second communicator transmits the selection signal of the first destination number by a dial-pulse method,
for the retransmission,
the controller makes the second communicator change either one or both of a make rate and a minimum-pause time in the parameters.

8. The communication apparatus according to claim 7, further comprising:
a storage medium,
wherein
after the selection signal of the first destination number is transmitted from the second communicator, when it is judged that the first communicator receives a call, the controller
  makes the storage medium store the parameters of the most recently transmitted selection signal, and
  makes the second communicator transmit the selection signal based on the parameters stored in the storage medium.

9. The communication apparatus according to claim 7, wherein
the controller
  makes the second communicator perform the retransmission again when it is judged that the first communicator does not receive a call after the retransmission, and
  changes the parameters of the selection signal for the respective retransmission.

10. The communication apparatus according to claim 9, further comprising:
a display panel that performs display,
wherein
when the retransmission is repeated,
the controller
  changes the parameters of the selection signal for the respective retransmission based on a pattern table in which patterns of the parameters are defined, and
  makes the display panel display adjustment failure and a need for a check when, even after the retransmission is performed with all the patterns defined in the pattern table, it is judged the first communicator does not receive a call.

11. The communication apparatus according to claim 7, wherein
when the second communicator transmits the selection signal of the first destination number by a DTMF method,
for the retransmission,
the controller makes the second communicator change either one or a plurality of a signal level, a signal ON time, and a signal OFF time in the parameters.

* * * * *